United States Patent
Thomas et al.

(10) Patent No.: US 7,513,925 B2
(45) Date of Patent: Apr. 7, 2009

(54) FILTERS

(75) Inventors: Payyappilly Antony Thomas, Pune (IN); Kulkarni Vivek Shrikrishna, Pune (IN); Khandkar Arun Ganesh, Pune (IN); Padwal Prasad Babanrao, Pune (IN); Pathak Rahul Sudhakar, Pune (IN)

(73) Assignee: Fleetguard Filters Pvt. Ltd., Pune (IN)

( * ) Notice: Subject to any disclaimer, the term of this patent is extended or adjusted under 35 U.S.C. 154(b) by 413 days.

(21) Appl. No.: 11/367,527

(22) Filed: Mar. 3, 2006

(65) Prior Publication Data

US 2006/0196156 A1    Sep. 7, 2006

(30) Foreign Application Priority Data

Mar. 4, 2005    (IN) .................. 248/MUM/2005

(51) Int. Cl.
*B01D 35/02*    (2006.01)
(52) U.S. Cl. .................. 55/502; 55/497; 55/498; 55/507; 55/509; 55/513; 210/443; 210/444; 210/450; 210/DIG. 17; 277/313; 277/596; 277/611; 277/918

(58) Field of Classification Search .................. 55/498, 55/502, 497, 507, 509, 513; 210/443, 444, 210/450, DIG. 17; 277/313, 596, 611, 918; 261/4, DIG. 72
See application file for complete search history.

(56) References Cited

U.S. PATENT DOCUMENTS

| | | | | |
|---|---|---|---|---|
| 2,602,521 A * | 7/1952 | Smith | .......................... | 55/487 |
| 2,636,572 A * | 4/1953 | Fleisher | ...................... | 55/443 |
| 4,466,817 A * | 8/1984 | Faas et al. | ..................... | 55/455 |
| 4,487,617 A * | 12/1984 | Dienes et al. | .................. | 96/113 |
| 4,501,707 A * | 2/1985 | Buhlmann | .................... | 261/94 |
| 4,519,960 A * | 5/1985 | Kitterman et al. | ............. | 261/94 |
| 5,096,453 A * | 3/1992 | Van Meter | .................... | 446/73 |
| 6,019,229 A * | 2/2000 | Rao | .......................... | 210/443 |
| 6,093,237 A * | 7/2000 | Keller et al. | .................. | 95/287 |
| 6,287,355 B1 * | 9/2001 | Park | ........................... | 55/419 |
| 6,761,270 B2 * | 7/2004 | Carew | ........................ | 210/352 |

* cited by examiner

*Primary Examiner*—Duane S. Smith
*Assistant Examiner*—Minh-Chau T Pham
(74) *Attorney, Agent, or Firm*—Charles A. Muserlian

(57) ABSTRACT

A filter assembly for fuel is disclosed. The assembly includes a housing and a filter element located in the housing and held in place by a spring. In the space between the inner wall of the housing and the base of the filter element a compressibly resilient element is located which absorbs hydraulic pulses, the filter assembly is subjected to.

8 Claims, 3 Drawing Sheets

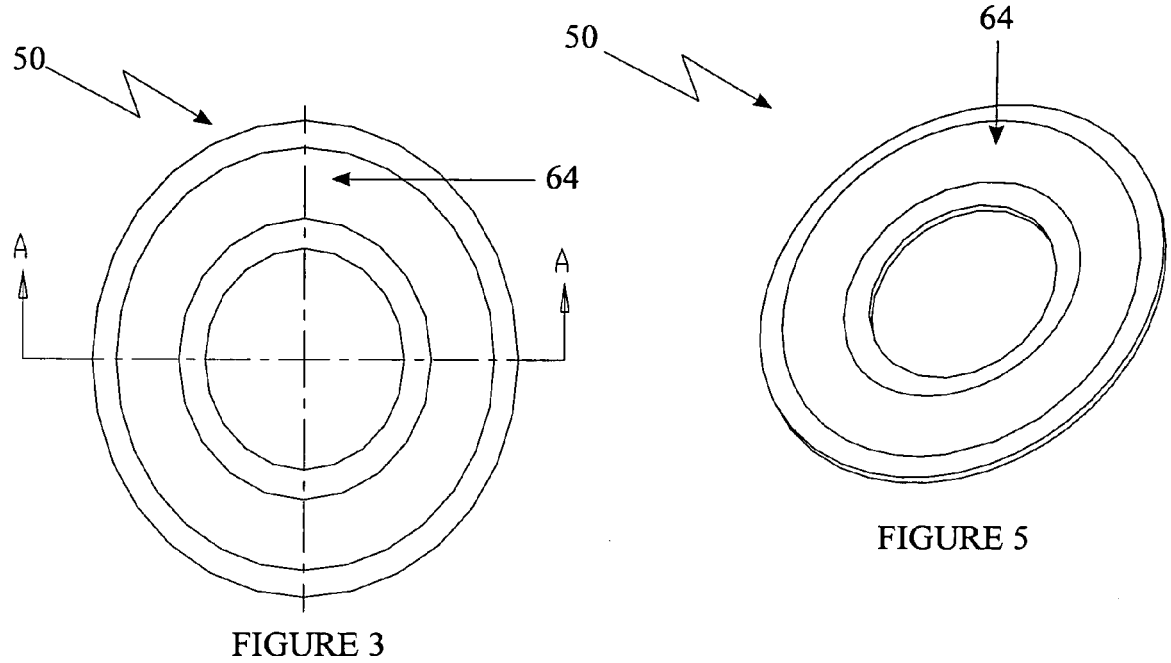
FIGURE 3
FIGURE 5
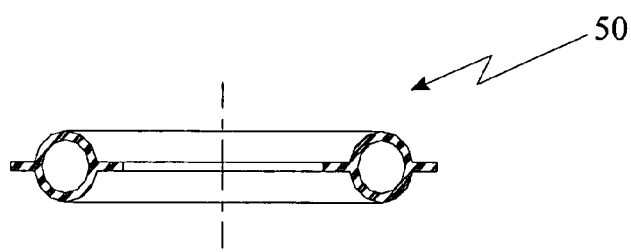
FIGURE 4

FILTERS

FIELD OF THE INVENTION

This invention relates to filters.

In particular, this invention relates to a filter assembly.

BACKGROUND OF THE INVENTION

Filter assemblies are used to filter different types of fluids, such as lubricating oils, fuels, hydraulic oils, coolants, and the like in various engines and other equipment.

These filter assemblies typically consists of a filter element fitted inside a casing and the entire assembly is fitted on a filter head. Dirty fluid enters a filtering chamber housing the filter element through one or more inlets, passes through the filter element, gets filtered, and the filtered fluid exits the assembly through an outlet. Due to the accumulation of dirt in the filter element, fluid permeability of the filter element decreases with time, and eventually it needs to be replaced.

There are mainly two types of filter assemblies. In one, the filter element is hermetically sealed inside its chamber, and the whole assembly is disposable after use. This type of filter assembly is normally known as "Spin on filter assembly." In the other type, only the filter element is removed from the casing at the end of use and replaced with a new one. This type of filter is normally known as "Cartridge" filter.

PRIOR ART

Vertical section of typical "spin on" type engine lubricating oil filter assembly as per prior art is shown in FIG. 1 of the accompanying drawings. Dirty oil enters through the oil inlet (10) into the assembly, passes through the filter element (12) gets filtered and passes through the perforated center tube (14) and exits the assembly through outlet (16). In this example, the cylindrical filter element is made of pleated filter paper bonded to metallic top cap (18) and bottom cap (20). The filter element is fitted inside a metallic shell (22), which is seamed with a nut plate (24) and retainer (26). The retainer (26) is welded to the nut plate (24). A spring (28) keeps the filter element (12) tightly seated against the nut plate (24) through an inner seal (30) thereby preventing dirty oil mixing with the filtered oil. The outlet (16) is threaded and is used to fit the filter assembly onto the filter head, which is part of the engine oil circuit. A rubber gasket (32) provides a tight seal between the filter assembly and the filter head to prevent oil leakage.

Sudden start-and-stop or sudden acceleration and deceleration occur during the operation of the engine. As a result the filter assembly is subjected to several cycles of hydraulic pressure impulses during its usage period. These hydraulic pressure impulses cause fatigue on various parts of the filter assembly leading to failure. As seen in FIG. 1, parts especially vulnerable to fatigue failure are the seam (34), rubber gasket (30), inner seal (28) and the shell (22).

This invention seeks to overcome the limitations of the prior art.

An object of this invention is to safeguard the filter assembly from the hydraulic pressure impulses caused due to sudden, start, stop, acceleration, deceleration occurring during engine operation.

Another object of this invention is to provide a filter assembly, which reduces the fatigue in the various part of the engine.

Another object of this invention is to provide a shock absorbing means thus reducing the hydraulic pressures acting on the filter components.

SUMMARY OF THE INVENTION

In accordance with this invention there is provided a filter assembly comprising:
(i) a housing, said housing defining an inner surface;
(ii) a filter element located in said housing, said filter element being resiliently spaced apart from said inner surface of said housing by a spring element, said filter element defining an operative bottom surface;
(iii) said operative bottom surface of said filter element and said inner surface of said housing defining a space;
(iv) fitment means for fitting said filter element within said housing;
(v) at least one compressibly resilient element located in said space in the operative configuration of said filter assembly;

Typically, said compressible resilient element is in the shape of a doughnut.

Typically, the compressible resilient element contains any compressible fluid such as air, nitrogen, inert gas and the like.

Typically, said compressible resilient element is of a material selected from a group of materials consisting of sponge, fiber or foam with impermeable skin in a single layer or in multi layers.

Typically, said compressible resilient element may be made from a material which is at least one selected from a group of materials consisting of natural rubber, thermoplastic elastomers, natural leather, synthetic leather, metallic foils, plastic foils, metallic films, plastic films, fabrics, coated fabrics, or a combination thereof.

Typically, said compressible resilient element occupies 0.5% to 80% of the free volume inside the housing Typically, said compressible resilient element has an internal pressure ranging from 0.1 Kg./cm$^2$ to 10 Kg./cm$^2$.

Typically, said compressible resilient element is provided with any desired geometric or non-geometric shape to fit inside the space defined by the operative bottom surface of the filter element and the inner surface of the housing.

Typically, said filter assembly is subjected to hydraulic pressure impulses up to 50 bars (i.e 51 Kg/cm2).

BRIEF DESCRIPTION OF THE ACCOMPANYING DRAWINGS

The invention will be described in detail with reference to a preferred embodiment. Reference to this embodiment does not limit the scope of the invention.

In the accompanying drawings:

FIG. 3 illustrates a plan view of the compressible resilient element;

FIG. 4 illustrates sectional elevation as seen in the direction of line A-A' as shown in FIG. 3; and FIG. 5 illustrates an isometric view of the compressible resilient.

DETAILED DESCRIPTION OF THE ACCOMPANYING DRAWINGS

The invention will now be explained with reference to FIGS. 2 to 5 of the accompanying drawings.

Figure 1:
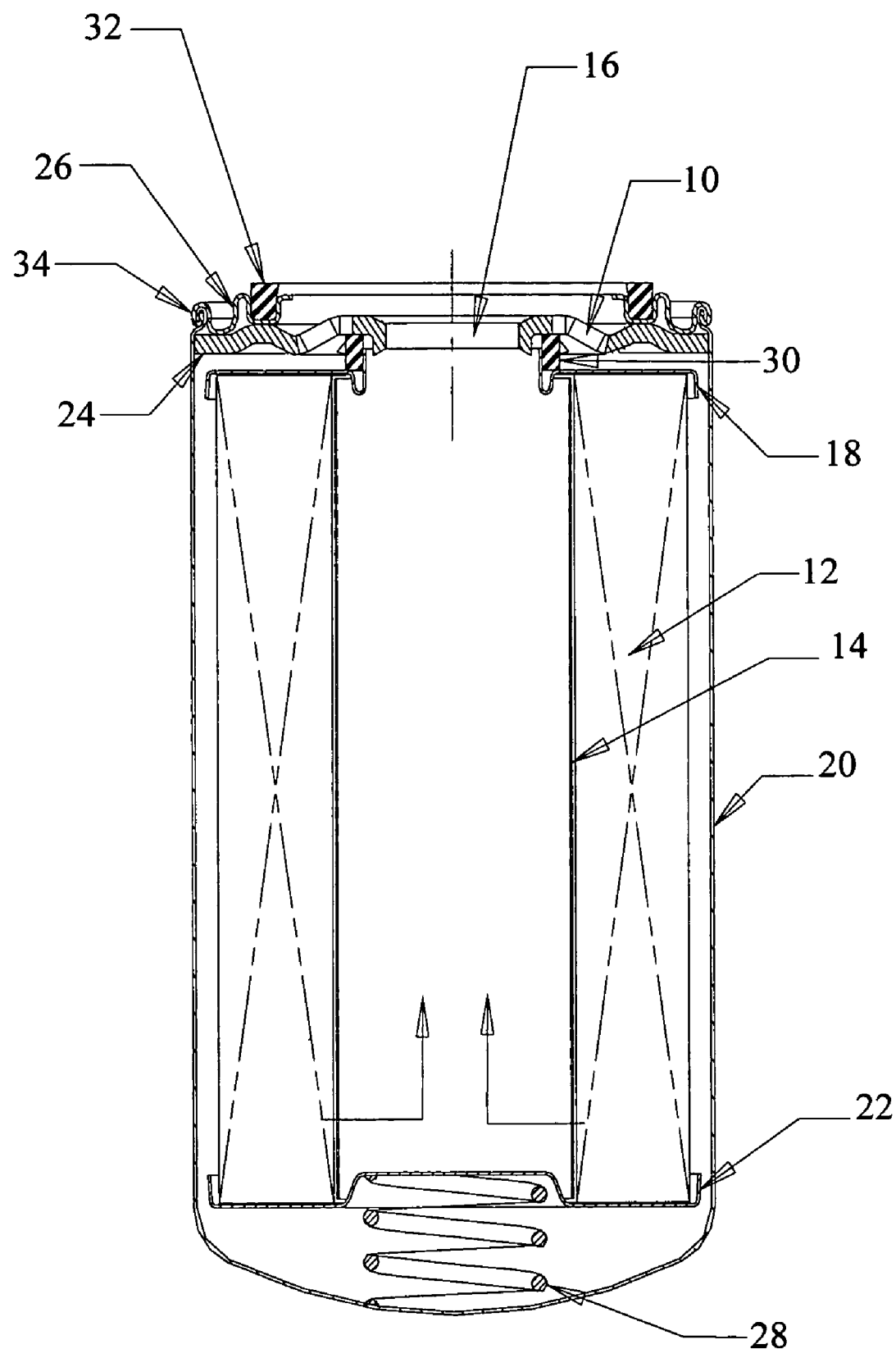
FIG. 1 illustrates a vertical sectional elevation of the filter assembly according to the prior art, as describer herein before.
Figure 2:
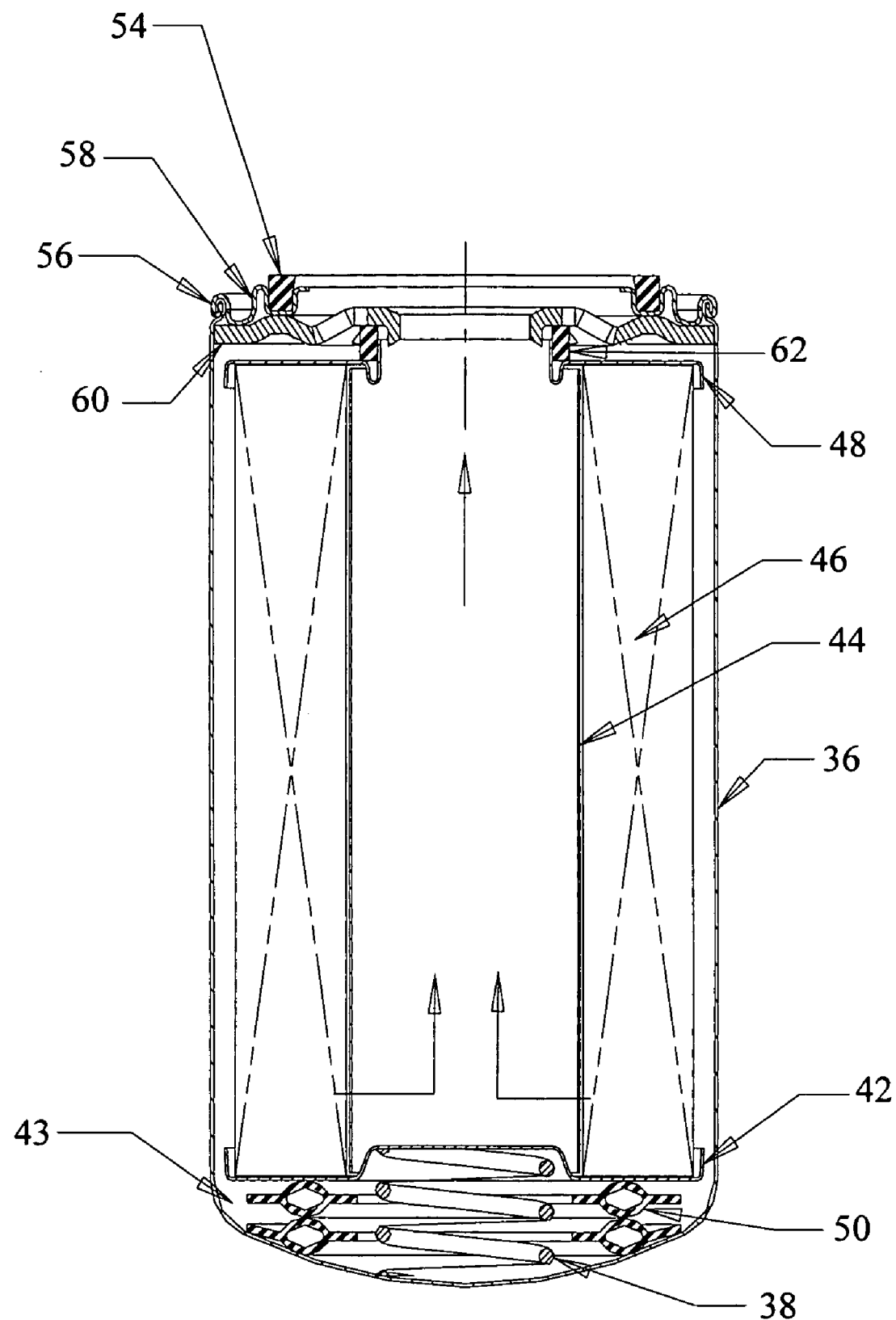
FIG. 2 illustrates a vertical sectional elevation of the filter assembly according to an embodiment of this invention.

In the accompanying drawings, FIG. 2 illustrates a vertical sectional view of a filter assembly in accordance with an exemplified embodiment of the invention. The filter assembly helps placing various filter components the filter assembly comprises:

(i) a housing (36) which house various filter components, operative top end of the housing which is open and operative bottom end is closed, said housing defining an inner surface.

(ii) a spring element (38) is placed within the housing on the inner surface of the housing (36). The spring element (38) accommodate a filter element (40) in a manner such that filter element (40) is placed on the spring element.

(iii) a filter element (40) for filtering the oil entering said filter assembly adapted to be located within the housing (36). The filter element (40) is resiliently spaced apart from the inner surface of the housing (36) by a spring element (38). The filter element (40) has an operative bottom surface. The operative bottom surface of the filter element (40) and the inner surface of housing (36) define a space. The filter element (40) comprises:

(a) an operatively bottom end cap (42) which is fitted over the spring element (38) in a manner such that a space (43) is defined between bottom end cap (42) of the filter element (38) and the operative bottom end of the housing (36).

(b) a perforated tube (44) is mounted centrally over the bottom end cap (42).

(c) plurality of filter paper elements (46) are mounted on the bottom end cap (42) in a manner such that at least one filter paper element (46) is placed on either side of the perforated tube (44).

(d) an operatively top end cap (48) is fitted to the operative top end of the filter element (40) in a manner such that it covers the operative top end of the filter element.

(iv) at least one compressible resilient element (50) which is located in the space (43) defined between said operative bottom end of said filter element (40) and inner surface of the housing (36).

(v) fitment means (52) for fitting the various components of the filter assembly;

(vi) a plurality of sealing means for sealing the operative top end of said housing, said sealing means may include rubber gaskets (54), seam joints (56), retainers (58), nut plates (60), inner sealing element (62) and the like.

FIG. 3, FIG. 4 and FIG. 5 respectively illustrates a plan view, a sectional elevation as seen in the direction of line A-A' as shown in FIG. 3 and an isometric view of the compressible resilient element. The compressible resilient element (50) is in the shape of a doughnut. The ring member (64) of the doughnut shaped compressible resilient means may be filled with any compressible fluid such as air, nitrogen, inert gas and the like. The compressible resilient element (50) may be made from a material selected from a group of materials, which include sponge, fiber or foam with impermeable skin in a single layer or in multi layers. The compressible resilient element (50) may be made from a material which may be one selected from a group of material such as natural rubber, thermoplastic elastomers, natural leather, synthetic leather, metallic foils, plastic foils, metallic films, plastic films, fabrics, coated fabrics, or a combination thereof. The compressible resilient element (50) occupies 0.5% to 80% of the free volume inside the housing and having an internal pressure ranging from 0.1 Kg./cm$^2$ to 10 Kg./cm$^2$. Although the compressible resilient element (50) as shown in the preferred embodiment is in the shape of a doughnut, it is possible that the element (50) may be of any desired geometric or non geometric shape. Inclusion the compressible resilient element (50) inside the filter assembly reduces the magnitude of the hydraulic pressure impulse by 10% to 90% thereby reducing the stress on the pressure-sensitive parts of the filter assembly, such as the housing inner seal, gasket seam joints, welded joints, crimped joints etc. which in turn increases the impulse fatigue resistance of the filter assembly up to 15 times.

Construction of the Doughnut-Shaped Elements:

The element (50) is imagined to be consisting of two symmetrical halves joined to each other, the plane of symmetry being the plane passing through the centre of the thickness of the outer and inner rims and parallel to them. A compression-moulding die is made to mould the symmetrical half. Such halves are compression moulded from nitrile rubber compound. Then a 0.2 mm thick annular ring having the dimensions to match the outer rim and another one to match the dimensions of the inner ring are cut from a sheet of uncured nitrile rubber compound and the same are placed over the respective rims of one half. Another symmetrical half is joined face-to-face to it such that the uncured rubber rings are sandwiched between the inner and outer rims of the two halves. This assembly is then cured by applying pressure at a particular temperature in a mould whereupon the uncured nitrile rubber compound cures and bonds the two halves. The finished doughnut-shaped element is obtained by demoulding.

The invention is further illustrated in the form of examples. However, these examples should not be construed as limiting the scope of the invention.

EXAMPLE 1

In an embodiment of the invention spin-on type fuel filters, similar to that shown in the accompanying drawings, were manufactured incorporating one hollow, doughnut-shaped, compressible and resilient element, where the spin-on filter had overall height of 137.8 mm, inside diameter of 92.4 mm, housing thickness of 0.71 mm, nut plate thickness of 3.05 mm and inner free volume of 760 ml (including the volume occupied by the doughnut-shaped, compressible and resilient element). The doughnut-shaped, compressible resilient means were filled with air at 1 atm pressure (i.e 1.03325 Kg/cm$^2$ which is equivalent to 14.508 psi). The filters made as per prior art and those made as per the present invention were mounted on a dynamic impulse test stand and subjected to the same hydraulic pulse at various levels and a comparative evaluation has been carried out. The results have been tabulated in table 1.

TABLE 1

| Sample no. | Hydraulic pulse flow in terms of adjustable valve opening (%) | Pressure experienced by filter as per prior art (psi) | Pressure experienced by filter as per present invention (psi) |
| --- | --- | --- | --- |
| 1 | 20 | 100 | 97 |
| 2 | 30 | 120 | 114 |
| 3 | 40 | 140 | 132 |
| 4 | 50 | 160 | 508 |
| 5 | 60 | 175 | 160 |

EXAMPLE 2

In an embodiment of the invention spin-on type fuel filters, similar to that shown in the attached drawing, were manufactured incorporating two hollow, doughnut-shaped, compressible resilient means, dimensions of the filter assembly are the same as mentioned in example 1. The doughnut-shaped compressible resilient means were filled with air at 1 atm pressure (i.e. 1.03325 kg/cm² which is equivalent to 14.508 psi). The filters made as per prior art and those made as per the present invention were mounted on a dynamic impulse test stand and subjected to the same hydraulic pulse at various levels and a comparative evaluation has been carried out. The results have been tabulated in table 2.

TABLE 2

| Sample no. | Hydraulic pulse flow in terms of adjustable valve opening (%) | Pressure experienced by filter as per prior art (psi) | Pressure experienced by filter as per present invention (psi) |
| --- | --- | --- | --- |
| 1 | 20 | 100 | 92 |
| 2 | 30 | 120 | 108 |
| 3 | 40 | 140 | 121 |
| 4 | 50 | 160 | 137 |
| 5 | 60 | 175 | 148 |

EXAMPLE 3

In an embodiment of the invention spin-on type fuel filters, similar to that shown in the attached drawing, were manufactured incorporating two hollow, doughnut-shaped, compressible resilient means, dimensions of the filter assembly are the same as mentioned in example 1. The doughnut-shaped compressible resilient means were filled with air at 1 atm pressure (i.e. 1.03325 kg/cm² which is equivalent to 14.508 psi). The filters made as per prior art and those made as per the present invention were mounted on a dynamic impulse test stand and subjected to the same hydraulic pulse at various levels and a comparative evaluation has been carried out. The results have been tabulated in table 3.

TABLE 3

| Sample no. | Hydraulic pulse flow in terms of adjustable valve opening (%) | Pressure experienced by filter as per prior art (psi) | Pressure experienced by filter as per present invention (psi) |
| --- | --- | --- | --- |
| 1 | 20 | 100 | 87 |
| 2 | 30 | 120 | 102 |
| 3 | 40 | 140 | 118 |
| 4 | 50 | 160 | 130 |
| 5 | 60 | 175 | 140 |

While considerable emphasis has been placed herein on the various components of the preferred embodiment and the interrelationships between the component parts of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

We claim:
1. A filter assembly comprising:
   (i) a housing, said housing defining an inner surface;
   (ii) a filter element located in said housing, said filter element being resiliently spaced apart from said inner surface of said housing by a spring element, said filter element defining an operative bottom surface;
   (iii) said operative bottom surface of said filter element and said inner surface of said housing defining a space;
   (iv) (iv) fitment means for fitting said filter element within said housing; and
   (v) at least one compressible resilient element having an impermeable skin containing a compressible fluid selected from air, nitrogen, and inert gas.
2. A filter assembly as claimed in claim 1, wherein said compressible resilient element is in the shape of a doughnut.
3. A filter assembly as claimed in claim 1, wherein the said compressible resilient element is made of a material selected from the group of materials consisting of sponge, fiber and foam in a single layer or in multi layers.
4. A filter assembly as claimed in claim 1, wherein the said compressible resilient element is made of a material which is at least one selected from the group of materials consisting of natural rubber, thermoplastic elastomers, natural leather, synthetic leather, metallic foils, plastic foils, metallic films, plastic films, fabrics and coated fabrics.
5. A filter assembly as claimed in claim 1, wherein the said compressible resilient element occupies 0.5% to 80% of the free volume inside the housing.
6. A filter assembly as claimed in claim 1, wherein said compressible element has an internal pressure ranging from 0.1 Kg./cm² to 2 to 10 Kg./cm².
7. A filter assembly as claimed in claim 1, wherein said compressible resilient element has a geometric or non-geometric shape to fit inside the housing of said filter assembly.
8. A filter assembly as claimed in claim 1, wherein said filter assembly is subjected to hydraulic pressure impulses up to 50 bars/51 Kg./cm².

* * * * *